(12) United States Patent
Wang et al.

(10) Patent No.: US 11,081,749 B2
(45) Date of Patent: Aug. 3, 2021

(54) BATTERY AND MANUFACTURING METHOD FOR THE SAME

(71) Applicant: DONGGUAN NVT TECHNOLOGY CO., LTD., Dongguan (CN)

(72) Inventors: Liming Wang, Dongguan (CN); Chenghong Gan, Dongguan (CN); Baiqing Zhang, Dongguan (CN); Guanghui Chen, Dongguan (CN); Wei Tang, Dongguan (CN)

(73) Assignee: DONGGUAN NVT TECHNOLOGY CO., LTD., Dongguan (CN)

( * ) Notice: Subject to any disclaimer, the term of this patent is extended or adjusted under 35 U.S.C. 154(b) by 284 days.

(21) Appl. No.: 16/252,872

(22) Filed: Jan. 21, 2019

(65) Prior Publication Data

US 2019/0229305 A1 Jul. 25, 2019

(30) Foreign Application Priority Data

Jan. 23, 2018 (CN) .......................... 201810065628.8

(51) Int. Cl.
*H01M 50/116* (2021.01)
*H01M 10/42* (2006.01)
*H01M 50/147* (2021.01)
*H01M 50/543* (2021.01)
*H01M 50/557* (2021.01)

(52) U.S. Cl.
CPC ..... *H01M 50/116* (2021.01); *H01M 10/4257* (2013.01); *H01M 50/147* (2021.01); *H01M 50/543* (2021.01); *H01M 50/557* (2021.01); *H01M 2010/4271* (2013.01)

(58) Field of Classification Search
CPC ............. H01M 50/116; H01M 50/147; H01M 50/543; H01M 50/557; H01M 10/4257; H01M 2010/4271
See application file for complete search history.

(56) References Cited

U.S. PATENT DOCUMENTS

2007/0026302 A1\* 2/2007 Yoon ................... H01M 50/543
429/129
2021/0104799 A1\* 4/2021 Choi ..................... H01M 50/20

FOREIGN PATENT DOCUMENTS

CN 207398287 U 5/2018

\* cited by examiner

*Primary Examiner* — Stewart A Fraser
(74) *Attorney, Agent, or Firm* — Juan Carlos A. Marquez; Marquez IP Law Office, PLLC

(57) ABSTRACT

The present application relates to the field of batteries, and discloses a battery and a manufacturing method for the same. The battery comprises a package bag, an electrode, and a circuit board assembly. The electrode is located in the package bag, and the electrode is further provided with a terminal. The terminal has one end connected to the electrode and located inside the package bag, and the other end located outside the package bag. The other end of the terminal is electrically connected to the circuit board assembly to form a protection portion, and the protection portion is covered by a protection layer. In the foregoing embodiment, the protection layer can cover structures requiring insulation protection, such as the circuit board assembly and the terminal, and the protection layer can be tightly adhered to the surfaces of the structures, thereby improving the reliability. Moreover, the protection layer can adapt to structures of various sizes during coating, and achieves high adaptability and production efficiency.

18 Claims, 8 Drawing Sheets

BATTERY AND MANUFACTURING METHOD FOR THE SAME

CROSS REFERENCE TO RELATED APPLICATIONS

The present application claims the benefit of priority from the China Patent Application No. 201810065628.8, filed on 23 Jan. 2018, the disclosure of which is hereby incorporated by reference in its entirety.

BACKGROUND

1. Field of the Invention

The present application relates to the field of batteries, and particularly, to a battery and a manufacturing method for the same.

2. Description of the Related Art

In a soft package secondary battery, an electrode is packaged inside a package bag. A terminal of the electrode extends out of the package bag, and an end of the terminal extending out of the package bag is electrically connected to a circuit board assembly. Problems of electrical corrosion and short circuit may easily occur in the exposed circuit board assembly and terminal, thereby affecting the service life of the battery.

In the prior art, an insulation tape is usually adhered on the surface of the circuit board assembly. During production, the insulation tape needs to be cut according to a particular structure, resulting in low production efficiency. Moreover, the insulation tape has a limited adhesive force and low reliability.

SUMMARY

The present application provides a battery and a manufacturing method for the same, so as to improve the insulation performance and reliability of the battery.

An embodiment of the present application provides a battery. The battery includes a package bag, an electrode, and a circuit board assembly, wherein the electrode is located in the package bag, and the electrode is further provided with a terminal, the terminal having one end connected to the electrode and located inside the package bag, and the other end located outside the package bag; and the other end of the terminal is electrically connected to the circuit board assembly to form a protection portion, and the protection portion is covered by a protection layer.

In the foregoing embodiment, the protection layer can cover structures requiring insulation protection, such as the circuit board assembly and the terminal. The protection layer can be tightly adhered to the surfaces of the structures, thereby improving the reliability. Moreover, the protection layer can adapt to structures of various sizes during coating, and achieves high adaptability and production efficiency.

Preferably, the protection layer is formed by an insulation curing material.

Preferably, the insulation curing material is one or more of an ultraviolet curing adhesive, silica gel, an epoxy resin, a hot-melt resin, and a Nano material.

In a specific implementation, the surface of the circuit board assembly is provided with a protected region and an exposed region, the protection layer covering the protected region.

Preferably, the circuit board assembly includes a circuit board and electronic components disposed on the circuit board, the protected region including pin areas on the electronic components.

In another specific implementation, the package bag includes a main body accommodating the electrode and a first side connected to the main body, the first side being laid in a flat manner, and the terminal extending out from the first side; and an accommodation space for accommodating the circuit board assembly is formed between the main body and the first side, the circuit board assembly being located in the accommodation space. The circuit board assembly is disposed in the accommodation space, thereby reducing the volume of the battery and improving the energy density of the battery.

During specific disposition, the protection layer includes a first protection layer and a second protection layer, the first protection layer covering at least an exposed cross section of the first side, and the second protection layer covering the surface of the protection portion.

Preferably, the first protection layer includes a package bag protection layer, the package bag protection layer covering at least the exposed cross section of the first side, an upper surface of the first side which is disposed towards the circuit board assembly, and a front end surface of the main body which is disposed towards the circuit board assembly. The package bag protection layer not only can provide insulation protection for the exposed cross section of the first side, but also can prevent the package bag from being broken when squeezed by the circuit board assembly, thereby avoiding battery short circuit and improving safety performance of the battery.

Preferably, the first protection layer further includes a terminal protection layer, the terminal protection layer covering at least an upper surface of the terminal which is disposed towards the circuit board assembly.

Preferably, the first protection layer further includes a circuit board assembly protection layer, the circuit board assembly protection layer covering at least pins in the circuit board assembly.

Preferably, the package bag further includes a second side connected to the main body, the second side being laid in a flat manner or fixed in a bent manner on a side surface of the main body; and the protection layer further includes a third protection layer, the third protection layer covering at least an exposed cross section of the second side.

To further improve the reliability of the battery, in the foregoing embodiment, the battery further includes a surface protection layer formed by an insulation tape, the surface protection layer covering at least the protection portion.

An embodiment of the present application further provides a manufacturing method for a battery. The battery includes a package bag, an electrode, and a circuit board assembly. The manufacturing method includes the following steps:

packaging the electrode in the package bag, a terminal of the electrode having one end connected to the electrode and located inside the package bag, and the other end located outside the package bag;

electrically connecting the circuit board assembly to the other end of the terminal to form a protection portion; and coating the surface of the battery with an insulation curing material, a protection layer being formed after the insulation curing material is cured, and the protection layer covering the protection portion.

In the foregoing embodiment, an insulation tape is replaced with the insulation curing material, and the surface of the battery is coated with the insulation curing material by using a coating process or an injection molding process. The insulation curing material can adapt to structures of various sizes during coating, and achieves high adaptability and production efficiency. Moreover, the insulation curing material can be tightly adhered to the surface of the battery during curing, thereby improving the reliability.

In a specific implementation, when the surface of the circuit board assembly is provided with an exposed region and a protected region, the step of coating the surface of the battery with an insulation curing material, a protection layer being formed after the insulation curing material is cured, and the protection layer covering the protection portion specifically includes:

coating the surface of the battery with the insulation curing material, the insulation curing material covering at least the protected region, the exposed region being exposed, and the protection layer being formed after the insulation curing material is cured.

In another specific implementation, when the package bag includes a main body accommodating the electrode and a first side connected to the main body, the first side is laid in a flat manner, the terminal extends out from the first side, and an accommodation space for accommodating the circuit board assembly is formed between the main body and the first side, the step of coating the surface of the battery with an insulation curing material, a protection layer being formed after the insulation curing material is cured, and the protection layer covering the protection portion specifically includes:

after the circuit board assembly is electrically connected to the terminal of the electrode, coating the surface of the battery with the insulation curing material, the insulation curing material covering at least an exposed cross section of the first side, and a first protection layer being formed after the insulation curing material is cured;

folding over the circuit board assembly into the accommodation space; and coating the surface of the protection portion with the insulation curing material, a second protection layer being formed after the insulation curing material is cured.

Preferably, the step of coating the surface of the battery with the insulation curing material, the insulation curing material covering at least an exposed cross section of the first side, and a first protection layer being formed after the insulation curing material is cured specifically includes:

coating the surface of the first side with the insulation curing material, the insulation curing material covering at least the exposed cross section of the first side and an upper surface of the first side, and further coating a front end surface of the main body with the insulation curing material, a package bag protection layer being formed after the insulation curing material is cured, wherein after the circuit board assembly is folded into the accommodation space, the upper surface of the first side is disposed towards the circuit board assembly, and the front end surface of the main body is disposed towards the circuit board assembly.

Preferably, the manufacturing method further includes coating the surface of the circuit board assembly with the insulation curing material, the insulation curing material covering at least pins in the circuit board assembly, and a circuit board assembly protection layer being formed after the insulation curing material is cured.

Preferably, the manufacturing method further includes coating the surface of the terminal with the insulation curing material, the insulation curing material covering at least an upper surface of the terminal, and a terminal protection layer being formed after the insulation curing material is cured, wherein after the circuit board assembly is folded into the accommodation space, the upper surface of the terminal is disposed towards the circuit board assembly.

To further improve the reliability of the battery, the manufacturing method further includes forming a surface protection layer by adhering an insulation tape to the surface of the battery, the surface protection layer covering at least the protection portion.

DESCRIPTIONS OF REFERENCE NUMERALS

| | |
|---|---|
| 10-Main body | 11-Front end surface |
| 20-First side | 21-Upper surface of the first side |
| 22-Cross section of the first side | 23-Lower surface of the first side |
| 30-Terminal | 31-Upper surface of the terminal |
| 32-Lower surface of the terminal | 40-Circuit board assembly |
| 41-Upper surface of the circuit board assembly | |
| 401-Circuit board | 4011-Test area |
| 402-Electronic component | 50-First protection layer |
| 51-Package bag protection layer | 52-Terminal protection layer |
| 53-Circuit board assembly protection layer | |
| 60-Second protection layer | 70-Side seal protection layer |
| 80-Surface protection layer | 90-Package bag |

DETAILED DESCRIPTION

To make the objectives, technical solutions, and advantages of the present application clearer, the following describes the present application in further detail with reference to the accompanying drawings. Apparently, the described embodiments are merely some, rather than all, of the embodiments of the present application. All other embodiments obtained by a person of ordinary skill in the art based on the embodiments of the present application without creative efforts shall fall within the protection scope of the present application.

An embodiment of the present application provides a battery. The battery includes a package bag, an electrode, and a circuit board assembly, wherein the electrode is located in the package bag, and the electrode is further provided with a terminal, the terminal having one end connected to the electrode and located inside the package bag, and the other end located outside the package bag.

The other end of the terminal is electrically connected to the circuit board assembly to form a protection portion, and the protection portion is covered by a protection layer.

In the foregoing embodiment, the protection layer can cover structures requiring insulation protection, such as the circuit board assembly and the terminal. The protection layer can be tightly adhered to the surfaces of the structures, thereby improving the reliability. Moreover, the protection layer can adapt to structures of various sizes during coating, and achieves high adaptability and production efficiency.

To make the structure of the battery provided in the present application easier to understand, the following describes the present application in detail with reference to the accompanying drawings.

Figure 1:
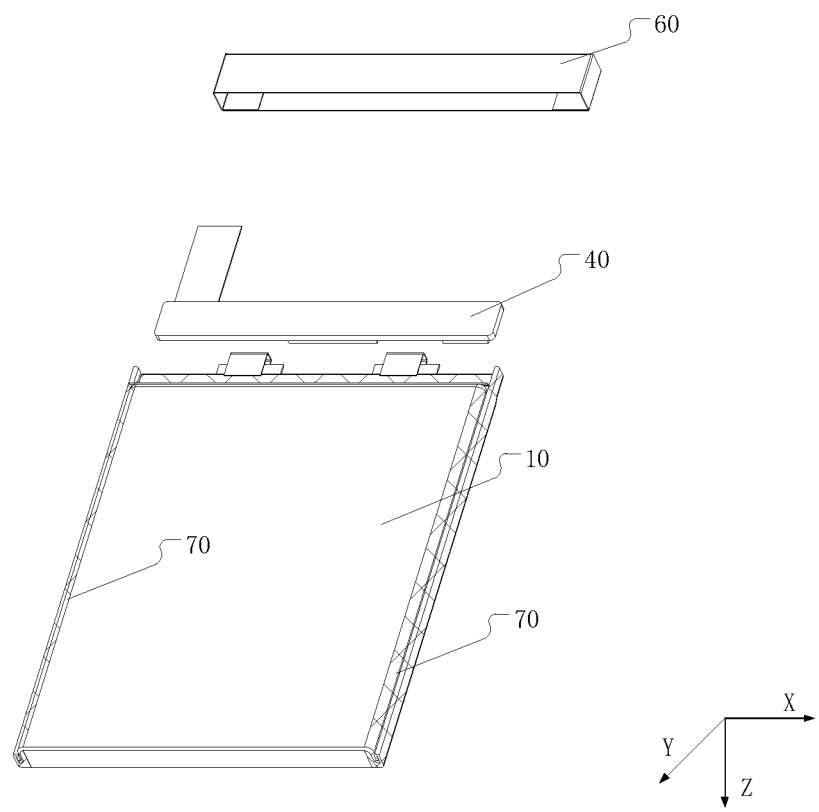
FIG. 1 is a structural exploded diagram of a battery according to an embodiment of the present application.

As shown in FIG. 1, the battery includes a package bag 90, an electrode, and a circuit board assembly 40. The electrode is located in the package bag 90, and the electrode is further provided with a terminal 30. The terminal 30 has one end connected to the electrode and located inside the package bag 90, and the other end located outside the package bag 90. During disposition, the end of the terminal 30 located outside the package bag 90 is electrically connected to the circuit board assembly 40 to form a protection portion, and the protection portion is covered by a protection layer. The protection layer covers structures on the battery that require insulation protection, such as the circuit board assembly 40 and the terminal 30, so as to prevent the problem of electrical corrosion or short circuit, and prolong the service life of the battery. In addition, the protection layer can further cover other parts of the battery, such as an exposed cross section of the package bag 90. Specifically, the protection layer is formed after an insulation curing material is cured. The insulation curing material includes one or more of an ultraviolet curing adhesive, silica gel, an epoxy resin, a hot-melt resin, and a Nano material, and may also be another material having an insulation protection effect. During production, the insulation curing material can be coated on the surface of the battery through a coating process or an injection molding process, such as adhesive spraying, adhesive dispensing, brush coating, or low-pressure injection molding. The insulation curing material can be tightly adhered to the surfaces of structures requiring insulation protection during curing, thereby effectively improving the strength and reliability of the battery. Moreover, the insulation curing material can adapt to structures of various sizes during coating, and achieves high adaptability and production efficiency.

Figure 2:
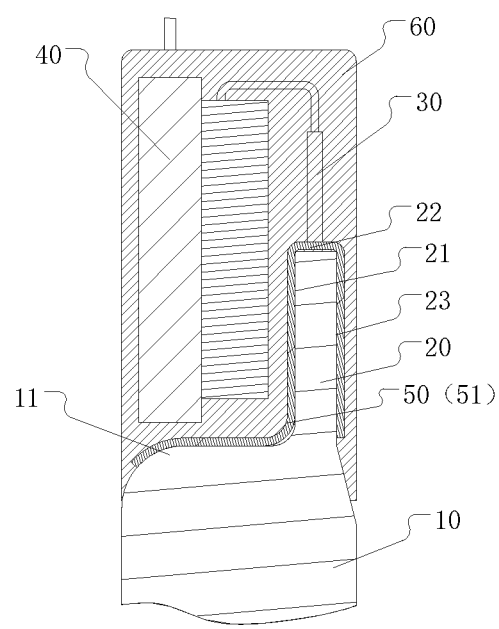
FIG. 2 is a cross-sectional diagram of a protection portion of the battery shown in FIG. 1.
Figure 8:
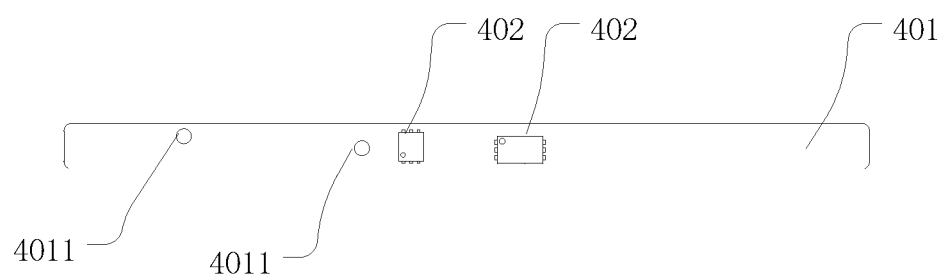
FIG. 8 is a schematic structural diagram of a circuit board assembly according to an embodiment of the present application.

The protection layer can provide insulation protection and cover areas where electrical corrosion or short circuit occurs easily on the circuit board assembly 40. The protection layer may cover the circuit board assembly 40 completely. As shown in FIG. 2, the protection layer wraps the circuit board assembly 40 or cover a partial area of the circuit board assembly 40. During disposition, the surface of the circuit board assembly 40 is provided with a protected region and an exposed region. The protected region is an area requiring insulation protection, and the protection layer covers the protected region. The exposed region is exposed and used for heat dissipation or temperature sensing. In a specific embodiment, as shown in FIG. 8, the circuit board assembly 40 includes a circuit board 401 and electronic components 402 disposed on the circuit board 401. The protected region includes pin areas on the electronic component 402. When the protection portion is coated with an insulation material, the insulation curing material covers the areas to provide insulation protection. Further, the surface of the circuit board 401 is further provided with test areas 4011. The test areas 4011 are used for detecting whether quality problems, such as short circuit, occur in the circuit board 401 and between the electronic components 402. The protected region includes the test areas 4011. After quality inspection is passed, to improve the insulation performance of the battery, the insulation curing material is used to cover the test areas 4011 on the circuit board 401 when the protection portion is coated with the insulation material. In addition, a partial area of the surface of the circuit board 401 or a partial area of the surface of each electronic component 402 may be set as an exposed region, so as to facilitate heat dissipation. For example, for some electronic components 402 with high heat output on the circuit board assembly 40, partial surfaces of the electronic components 402 can be set as exposed regions, so as to facilitate heat dissipation. For an electronic component 402 with low heat output, the entire area thereof can be coated with the insulation curing material. As such, during forming of the protection layer, a coating area of the insulation curing material can be designed flexibly according to the temperature of each electronic component 402.

Figure 3:
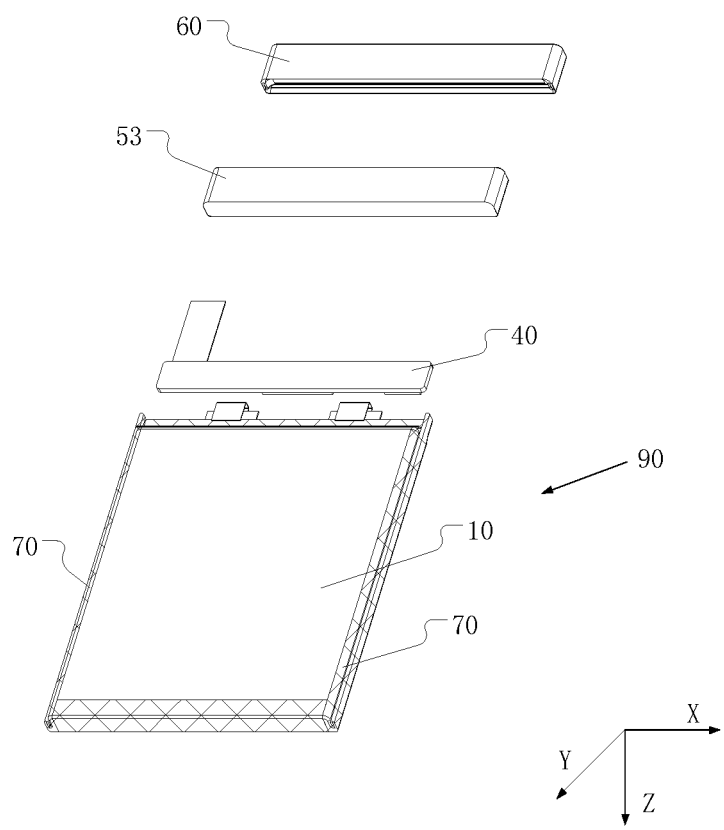
FIG. 3 is a structural exploded diagram of a battery according to another embodiment of the present application.
Figure 4:
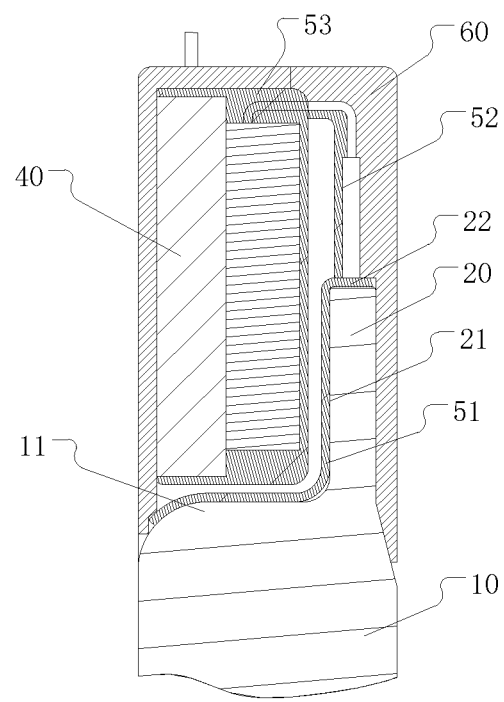
FIG. 4 is a cross-sectional diagram of a protection portion of the battery shown in FIG. 3.
Figure 5:
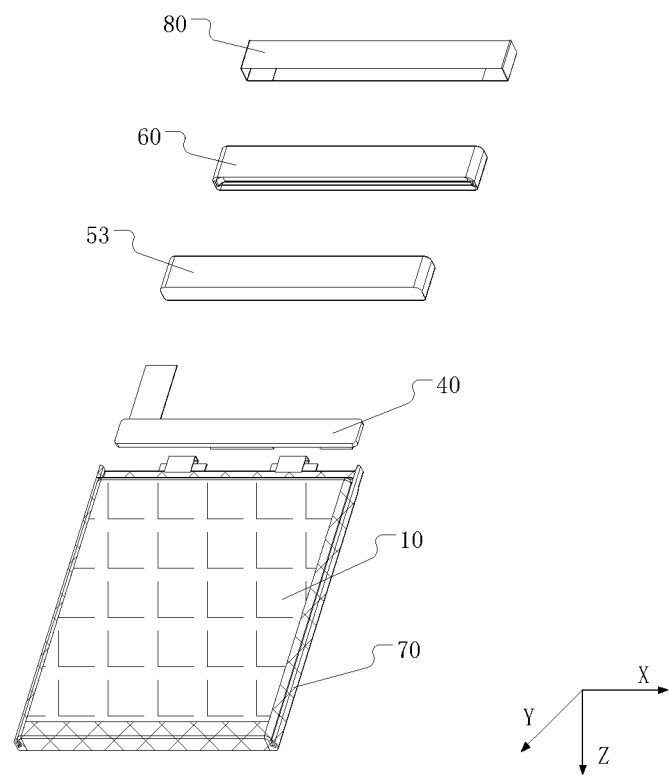
FIG. 5 is a structural exploded diagram of a battery according to another embodiment of the present application.
Figure 6:
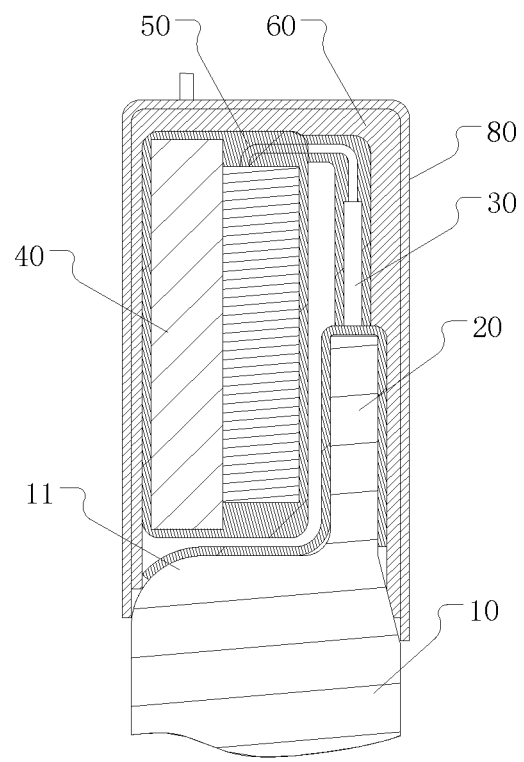
FIG. 6 is a cross-sectional diagram of a protection portion of the battery shown in FIG. 5.
Figure 7:
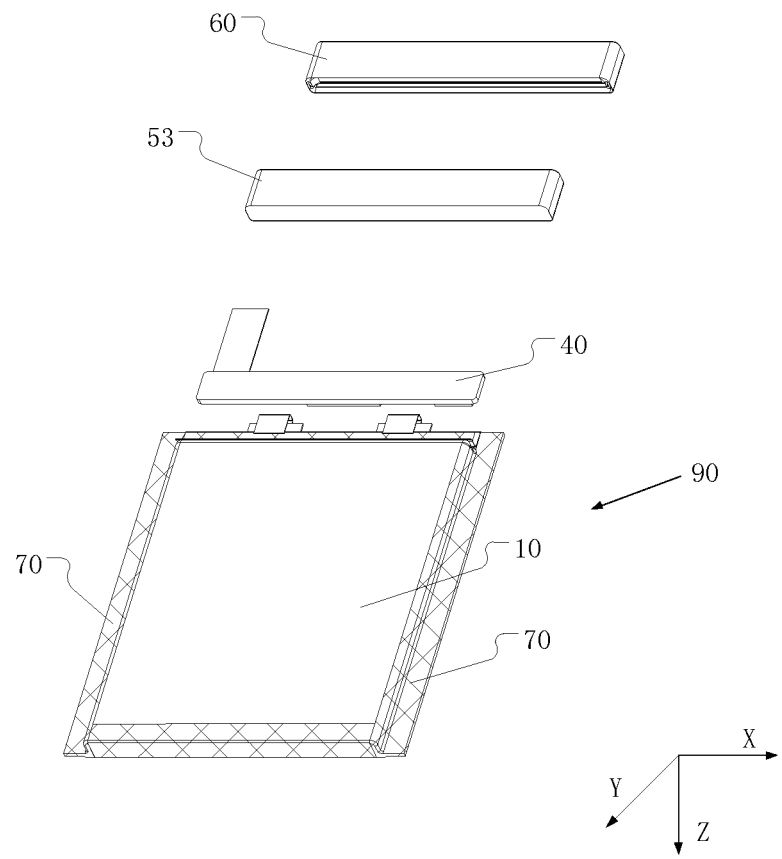
FIG. 7 is a structural exploded diagram of a battery according to another embodiment of the present application.

During specific disposition, the package bag 90 includes a main body 10 accommodating the electrode and a first side 20 connected to the main body 10. The first side 20 is laid in a flat manner, and the terminal 30 extends out from the first side 20. The package bag 90 further includes a second side connected to the main body 10. The second side is disposed in a flat manner or fixed in a bent manner on a side surface of the main body 10. The package bag 90 is formed by an upper package film and a lower package film sealed together. In the process of packaging the electrode, one of the package films is punched to form a pit, and the electrode is placed into the pit. Then, the peripheries of the two package films are sealed to form the main body of the package bag 90 and the first side 20 as well as the second side connected to the main body. During specific disposition, the second side includes two side seal edges that are located on two opposite sides of the main body 10. As shown in FIG. 1, FIG. 3, and FIG. 5, each side seal edge is fixed on a corresponding side surface of the main body 10 in a bent manner. The side seal edges can be bent in different manners, such as single flanging or double flanging. Alternatively, as shown in FIG. 7, the side seal edges are laid in a flat manner on two sides of the main body 10. With reference to the spatial position of the battery in the foregoing figure, for ease of description, two surfaces of the main body 10 that are distributed along direction X are recorded as a left side surface and a right side surface, two surfaces of the main body 10 that are distributed along direction Y are recorded as a front end surface 11 and a rear end surface, and two surfaces of the main body 10 that are distributed along direction Z are recorded as a top surface and a bottom surface. The two opposite side surfaces (the left side surface and the right side surface) of the main body 10 are connected to side seal edges respectively, and the side seal edges are fixed on the side surfaces of the main body 10 in a bent manner through double flanging. The front end surface 11 of the main body 10 is connected to the first side 20, and the terminal 30 of the electrode extends out from the first side 20. As shown in the cross-sectional diagrams of the protection portion in FIG. 2, FIG. 4, and FIG. 6, an accommodation space for accommodating the circuit board assembly 40 is formed between the main body 10 and the first side 20. The terminal 30 extends out from the first side 20 and is then electrically connected to the circuit board assembly 40 in the accommodation space. As such, the space occupied by the protection portion is effectively reduced, thereby improving the energy density.

In a specific embodiment, the protection layer includes a first protection layer 50 and a second protection layer 60. The first protection layer 50 covers at least an exposed cross section of the first side 20, to provide insulation protection for a metal layer in the cross-sectional area and prevent the metal layer from being connected to other elements to cause a short-circuit fault. The second protection layer 60 covers the surface of the protection portion to provide insulation protection for an exposed part of the protection portion. In terms of process, the first protection layer 50 is formed before the circuit board assembly 40 is folded into the accommodation space, and is mainly used for achieving an insulation protection effect between internal components. The second protection layer 60 is formed after the circuit board assembly 40 is folded into the accommodation space, and is mainly used for achieving an insulation protection effect for the surface of the compressed protection portion. In terms of structure, the first protection layer 50 and the second protection layer 60 can be coated on different areas of the battery in sequence, or be laminated, that is, the second protection layer 60 is attached to the surface of the first protection layer 50. As shown in FIG. 2, the first protection layer 50 covers the first side 20; the second protection layer 60 covers the circuit board assembly 40 and the terminal 30. The first protection layer 50 and the second protection layer 60 overlap each other on a lower surface 23 of the first side. When the second protection layer 60 is formed, the insulation curing material can also be filled into a gap between the circuit board assembly 40 and the terminal 30 as well as a gap between the first side 20 and the main body 10.

During specific disposition, the first protection layer 50 includes a package bag protection layer 51. The package bag protection layer 51 covers at least the exposed cross section of the first side 20, an upper surface of the first side 20 which is disposed towards the circuit board assembly 40, and the front end surface 11 of the main body 10 which is disposed towards the circuit board assembly 40. The package bag protection layer 51 not only can provide insulation protection for the exposed cross section of the first side 20, but also can prevent the package bag 90 (parts corresponding to the front end surface 11 of the main body 10 and the upper surface 21 of the first side) from being broken when pressed by the circuit board assembly 40, thereby avoiding battery short circuit and improving safety performance of the battery. As shown in FIG. 4, the package bag protection layer 51 covers the front end surface 11 of the main body 10, the upper surface 21 of the first side, and the cross section 22 of the first side. In order to completely wrap the area of the cross section 22 of the first side and further improve the safety performance. As shown in FIG. 6, the package bag protection layer 51 also covers the area of the lower surface 23 of the first side, that is, a surface away from the circuit board assembly 40.

The first protection layer 50 further includes a terminal protection layer 52. The terminal protection layer 52 covers at least an upper surface of the terminal which is disposed towards the circuit board assembly 40. In a specific embodiment, as shown in FIG. 6, the terminal protection layer 52 covers both the upper surface of the terminal 30 which is disposed towards the circuit board assembly 40 and the lower surface of the terminal 30 which is disposed away from the circuit board assembly 40. The first protection layer 50 further includes a circuit board assembly protection layer 53. The circuit board assembly protection layer 53 covers at least pins exposed in the circuit board assembly 40. Specifically, as shown in FIG. 4, the circuit board assembly protection layer 53 covers an end surface of the circuit board assembly 40 which is connected to the terminal 30, an end surface of the circuit board assembly 40 which is disposed towards the main body 10, a surface of the circuit board assembly 40 which is disposed towards the first side 20, and two side surfaces of the circuit board assembly 40, excluding a surface of the circuit board assembly 40 which is disposed away from the first side 20. Alternatively, as shown in FIG. 6, the circuit board assembly protection layer 53 covers the entire area of the circuit board assembly 40, so as to enhance the insulation performance between the circuit board assembly 40 and the terminal 30 and between the circuit board assembly 40 and the first side 20.

In addition to the protection portion, the protection layer may further cover other parts of the battery. Specifically, the protection layer further includes a third protection layer. The third protection layer covers at least an exposed cross section of the second side. The third protection layer is mainly used for providing insulation protection for an exposed metal layer of the second side. During specific disposition, the third protection layer includes two side seal protection layers 70 that are distributed on the left and right sides of the main body 10 along direction X. In a specific embodiment, a double flanging design is used. Each side seal edge is fixed on a side surface of the main body 10 after being bent twice. Each side seal protection layer 70 covers at least one side seal edge and an exposed area on the side surface of the main body 10 corresponding to the side seal edge. Each side seal protection layer 70 may further extend to the top surface of the main body 10 or the bottom surface of the main body 10, or extend to both the top surface and bottom surface of the main body 10 to wrap the main body 10, thereby expanding the coverage of the side seal protection layers 70 and improving the adhesive force and sealing effect of the side seal protection layers 70. Further, the two side seal protection layers 70 are connected laterally to completely cover the top surface and the bottom surface of the main body 10. A gap still exists between the bent side seal edge and the side surface of the main body 10, and an end portion of the side seal edge is prone to wear. Therefore, during specific disposition, each side seal protection layer 70 further extends to the rear end surface of the main body 10 to protect the end portions of the side seal edges. The two side seal protection layers 70 may further extend at the rear end surface of the main body 10 and be connected into a whole, so as to completely cover the rear end surface of the main body 10. Further, the side seal protection layers 70 extend from the rear end surface of the main body 10 to the top surface and bottom surface of the main body 10 to completely wrap the rear end surface of the main body 10, so as to enhance the insulation effect of the rear end surface of the main body 10.

In addition, a surface protection layer 80 may further be formed through an insulation tape. The surface protection layer 80 covers at least the protection portion. As such, internal-external-surface three-level protection is implemented on the protection portion. In addition to the protection portion, an insulation tape may also be adhered to the surface of the main body 10 to wrap both the protection portion and the main body 10, thereby not only enhancing the insulation performance and reliability of the battery but also making the appearance of the battery more beautiful. Three specific embodiments are listed in the following, and are described in detail with reference to the accompanying drawings.

Embodiment 1

Referring to FIG. 1 and FIG. 2 together, the battery includes a package bag 90, an electrode, and a circuit board assembly 40. The package bag 90 is used for packaging the electrode. After packaging, a main body 10 of the battery as well as a first side 20 and a second side that are connected to the main body 10 are formed. The terminal 30 has one end connected to the electrode and located inside the main body 10, and the other end extending out from the first side 20. The second side includes two side seal edges that are located on two opposite sides of the main body 10 respectively, and each side seal edge is fixed on a side surface of the main body 10 in a bent manner. The circuit board assembly 40 is located in an accommodation space formed by the main body 10 and the first side. The terminal 30 is electrically connected to the circuit board assembly 40 after extending out from the first side 20, to form a protection portion. The protection portion is covered by a protection layer formed by an insulation curing material.

The protection layer includes a first protection layer 50 and a second protection layer 60. The first protection layer 50 includes a package bag protection layer 51. The package bag protection layer 51 covers a front end surface 11 of the main body 10, an upper surface 21 of the first side, a cross section 22 of the first side, and a lower surface 23 of the first side. The second protection layer 60 covers the surface of the protection portion, including exposed parts of the circuit board assembly 40 and the terminal 30, as shown in FIG. 2. During forming of the second protection layer 60, the insulation curing material is further filled into a gap between the circuit board assembly 40 and the terminal 30 as well as a gap between the first side 20 and the main body 10, thereby further improving the insulation performance and reliability.

The protection layer further includes a third protection layer. As shown in FIG. 1, the third protection layer includes two side seal protection layers 70. Each side seal protection layer 70 covers one side seal edge and an exposed area on the side surface of the main body 10 corresponding to the side seal edge. Each side seal protection layer 70 further extends to a top surface of the main body 10 and a bottom surface of the main body 10, and also extends to a rear end surface of the main body 10 to cover a rear end part of the side seal edge.

In other embodiments, in order to achieve heat dissipation and temperature sensing effects for some electronic components in the circuit board assembly 40, partial areas on the surfaces of these electronic components may be set as exposed regions. When the protection portion is coated with the insulation curing material, the insulation curing material covers parts except the exposed regions.

A specific manufacturing process of the battery is as follows:

Step 1. Package an electrode in a package bag 90, the package bag 90 forming a main body 10 for accommodating the electrode as well as a first side 20 and a second side that are connected to the main body 10, a terminal 30 having one end connected to the electrode and located inside the main body 10, and the other end extending out from the first side 20, the second side including two side seal edges, and each side seal edge being fixed on a side surface of the main body 10 in a bent manner.

Step 2. Electrically connect a circuit board assembly 40 to the other end of the terminal 30 to form a protection portion.

Step 3. Coat left and right sides of the battery with an insulation curing material, the insulation curing material covering each side seal edge and an exposed area on the side surface of the main body 10 corresponding to the side seal edge, and extending to a top surface and a bottom surface of the main body 10 to wrap both sides of the main body 10, the insulation curing material on each side extending to a rear end surface of the main body 10 to cover a rear end part of each side seal edge, and a third protection layer being formed after the insulation curing material is cured.

Step 4. Coat the surface of the battery with the insulation curing material, the insulation curing material covering at least an exposed cross section of the first side 20, and a first protection layer 50 being formed after the insulation curing material is cured. Specifically, the surface of the first side 20 is coated with the insulation curing material, the insulation curing material covering an upper surface 21 of the first side, a cross section 22 of the first side, and a lower surface 23 of the first side; a front end surface 11 of the main body 10 is coated with the insulation curing material, the first protection layer 50 (a package bag protection layer 51) being formed after the insulation curing material is cured.

Step 5. Fold the circuit board assembly 40 into an accommodation space formed by the front end surface 11 of the main body 10 and the upper surface 21 of the first side.

Step 6. Coat the surface of the protection portion with an insulation curing material, for example, coat the circuit board assembly 40, an exposed part of the terminal 30, and a part of the package bag protection layer 51 which is located on the lower surface of the first side 20, a second protection layer 60 being formed after the insulation curing material is cured. In addition, as shown in FIG. 2, the insulation curing material is further filled in a gap between the circuit board assembly 40 and the terminal 30 as well as a gap between the first side 20 and the main body 10. For example, the second protection layer 60 is formed on the protection portion of the battery by using an injection molding process.

Further, in step 7, an insulation tape may be adhered to the surface of the protection portion to form a surface protection layer 80, or an insulation tape is adhered to both the surfaces of the protection portion and the main body 10 to form a surface protection layer 80, so as to further enhance the insulation performance and strength of the battery.

Embodiment 2

Referring to FIG. 3 and FIG. 4 together, compared with Embodiment 1, the protection layer formed in Embodiment 2 has the following specific differences:

As shown in FIG. 4, the first protection layer 50 includes a package bag protection layer 51. The package bag protection layer 51 covers the front end surface 11 of the main body 10, the upper surface 21 of the first side, and the cross section 22 of the first side. The first protection layer 50 further includes a terminal protection layer 52 and a circuit board assembly protection layer 53. The terminal protection layer 52 covers an upper surface of the terminal 30 which is disposed towards the circuit board assembly 40. The circuit board assembly protection layer 53 covers an end surface of the circuit board assembly 40 which is connected to the terminal 30, an upper surface of the circuit board assembly 40 which is disposed towards the first side 20, an end surface of the circuit board assembly 40 which is away from the terminal 30, and two side surfaces.

The second protection layer 60 covers the surface of the protection portion, including a lower surface of the circuit board assembly 40 which is disposed away from the first side 20, a lower surface of the terminal 30 which is disposed away from the circuit board assembly 40, and a lower surface of the first side 20 which is disposed away from the circuit board assembly 40. In addition to the areas that are not coated with the insulation curing material during forming of the first protection layer 50, the second protection layer 60 further covers areas coated with the insulation curing material. That is, in some areas, the second protection layer 60 and the first protection layer 50 are stacked to form internal-external double protection. In addition, during forming of the second protection layer 60, the insulation curing material may also be filled into a gap between the circuit board assembly 40 and the terminal 30 as well as a gap between the first side 20 and the main body 10, so as to further improve the insulation performance and reliability. In other embodiments, in order to achieve heat dissipation and temperature sensing effects for some electronic components in the circuit board assembly 40, partial areas on the surfaces of these electronic components may be set as exposed regions. When the protection portion is coated with the insulation curing material to form internal and external protection layers, the insulation curing material covers parts except the exposed regions.

As shown in FIG. 3, compared with Embodiment 1, the two side seal protection layers 70 are connected to the rear end surface of the main body 10 to form a whole, and extend to the top surface and the bottom surface from the rear end surface of the main body 10, to completely wrap the rear end surface of the main body 10.

A specific manufacturing process of the battery is as follows:

Step 1. Package an electrode in a package bag 90, the package bag 90 forming a main body 10 for accommodating the electrode as well as a first side 20 and a second side that are connected to the main body 10, a terminal 30 having one end connected to the electrode and located inside the main body 10, and the other end extending out from the first side 20, the second side including two side seal edges, and each side seal edge being fixed on a side surface of the main body 10 in a bent manner.

Step 2. Electrically connect a circuit board assembly 40 to the other end of the terminal 30 to form a protection portion.

Step 3. Coat left and right sides of the battery with an insulation curing material, the insulation curing material covering each side seal edge and an exposed area on the side surface of the main body 10 corresponding to the side seal edge, and extending to a top surface and a bottom surface of the main body 10 to wrap both sides of the main body 10, the insulation curing material on each side extending to a rear end surface of the main body 10, the insulation curing material from both sides being connected into a whole on the rear end surface of the main body 10 to completely wrap the rear end surface of the main body 10, and a third protection layer being formed after the insulation curing material is cured.

Figure 4A:
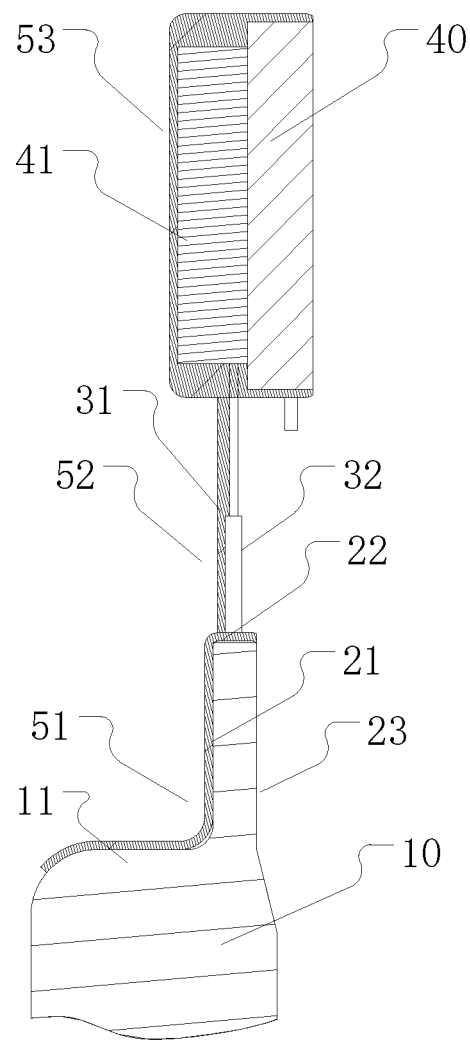
FIG. 4a to FIG. 4c are flowcharts of a process for forming the protection portion of the battery shown in FIG. 4.

Step 4. Coat the surface of the battery with the insulation curing material, the insulation curing material covering at least an exposed cross section of the first side 20, and a first protection layer 50 being formed after the insulation curing material is cured. Step 4 specifically includes:

I) As shown in FIG. 4a, coat the surface of the first side 20 with the insulation curing material, the insulation curing material covering an upper surface 21 of the first side and an exposed cross section of the first side 20, and coat the front end surface 11 of the main body 10 with the insulation curing material, a package bag protection layer 51 being formed after the insulation curing material is cured.

II) As shown in FIG. 4a, coat the surface of the terminal 30 with the insulation curing material, the insulation curing material covering an upper surface 31 of the terminal, and a terminal protection layer 52 being formed after the insulation curing material is cured.

III) As shown in FIG. 4a, coat the surface of the circuit board assembly 40 with the insulation curing material, the insulation curing material covering an end surface of the circuit board assembly 40 which is connected to the terminal 30, an upper surface 41 of the circuit board assembly, an end surface of the circuit board assembly 40 which is away from the terminal 30, and two side surfaces, and a circuit board assembly protection layer 53 being formed after the insulation curing material is cured. Step I to step III may be formed through one process procedure, or formed by multiple process procedures.

Figure 4B:
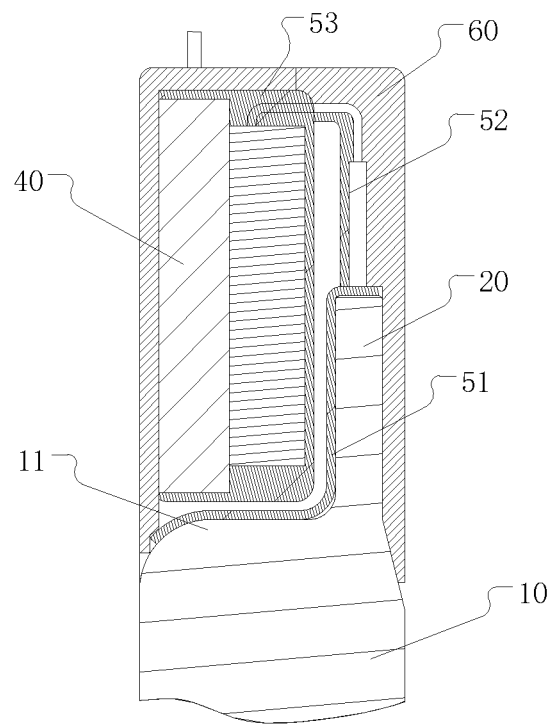

Step 5. As shown in FIG. 4b, fold the circuit board assembly 40 into an accommodation space formed by the front end surface 11 of the main body 10 and the upper surface 21 of the first side. In this case, in step II, the upper surface 31 of the terminal 30 which is coated with the insulation curing material is disposed towards the circuit board assembly 40; in step III, the upper surface 41 of the circuit board assembly 40 which is coated with the insulation curing material is disposed towards the first side 20, and the end surface of the circuit board assembly 40 which is coated with the insulation curing material and away from the terminal 30 is disposed towards the main body 10.

Step 6. Coat the surface of the protection portion with the insulation curing material, a second protection layer 60 being formed after the insulation curing material is cured. In order to enhance the insulation performance and reliability, during coating of the insulation curing material, the insulation curing material further covers a part of the package bag protection layer 51 which is located on the lower surface of the first side 20.

Figure 4C:
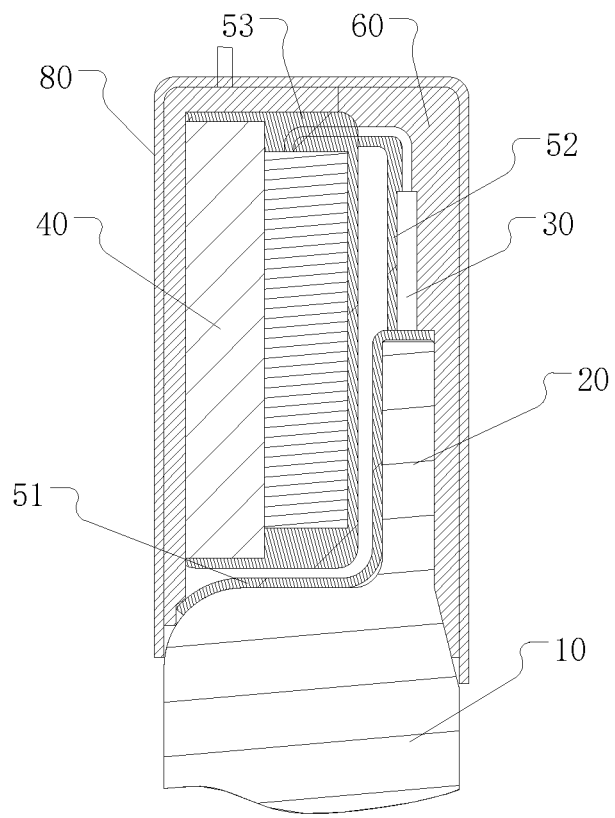

As shown in FIG. 4c, in step 7, an insulation tape may be further adhered to the surface of the protection portion to form a surface protection layer 80, or an insulation tape is adhered to both the surfaces of the protection portion and the main body 10 to form a surface protection layer 80, so as to further enhance the insulation performance and strength of the battery.

Embodiment 3

Referring to FIG. 6 and FIG. 7 together, compared with Embodiment 2, the protection layer formed in Embodiment 3 has the following specific differences:

As shown in FIG. 7, the first protection layer 50 includes a package bag protection layer 51. The package bag protection layer 51 covers the front end surface 11 of the main body 10, the upper surface 21 of the first side, the cross section 22 of the first side, and the lower surface 23 of the first side. The first protection layer 50 further includes a terminal protection layer 52 and a circuit board assembly protection layer 53. The terminal protection layer 52 covers an upper surface of the terminal 30 which is disposed towards the circuit board assembly 40, and a lower surface of the terminal 30 which is disposed away from the circuit board assembly 40. The circuit board assembly protection layer 53 covers the entire surface of the circuit board assembly 40.

The second protection layer 60 covers the surface of the protection portion to form internal-external double protection. In order to enhance the insulation performance and reliability, during coating of the insulation curing material, the insulation curing material further covers a part of the package bag protection layer 51 located on the lower surface of the first side 20. In addition, the insulation curing material may further be filled in a gap between the circuit board assembly 40 and the terminal 30 as well as a gap between the first side 20 and the main body 10, so as to further improve the insulation performance and reliability. In other embodiments, in order to achieve heat dissipation and temperature sensing effects for some electronic components in the circuit board assembly 40, partial areas on the surfaces of these electronic components may be set as exposed regions. When the protection portion is coated with the insulation curing material to form internal and external protection layers, the insulation curing material covers parts except the exposed regions.

As shown in FIG. 6, compared with Embodiment 1, in the third protection layer of the battery, the two side seal protection layers 70 extend to the top surface and bottom surface of the main body 10 to completely wrap the surface of the main body 10.

A specific manufacturing process of the battery is as follows:

Step 1. Package an electrode in a package bag 90, the package bag 90 forming a main body 10 for accommodating the electrode as well as a first side 20 and a second side that are connected to the main body 10, a terminal 30 having one end connected to the electrode and located inside the main body 10, and the other end extending out from the first side 20, the second side including two side seal edges, and each side seal edge being fixed on a side surface of the main body 10 in a bent manner.

Step 2. Electrically connect a circuit board assembly 40 to the other end of the terminal 30 to form a protection portion.

Step 3. Coat left and right sides of the main body 10 as well as a top surface, a bottom surface, and a rear end surface of the main body 10 with an insulation curing material, a third protection layer being formed after the insulation curing material is cured, and the third protection layer wrapping the entire area of the main body 10.

Figure 6A:
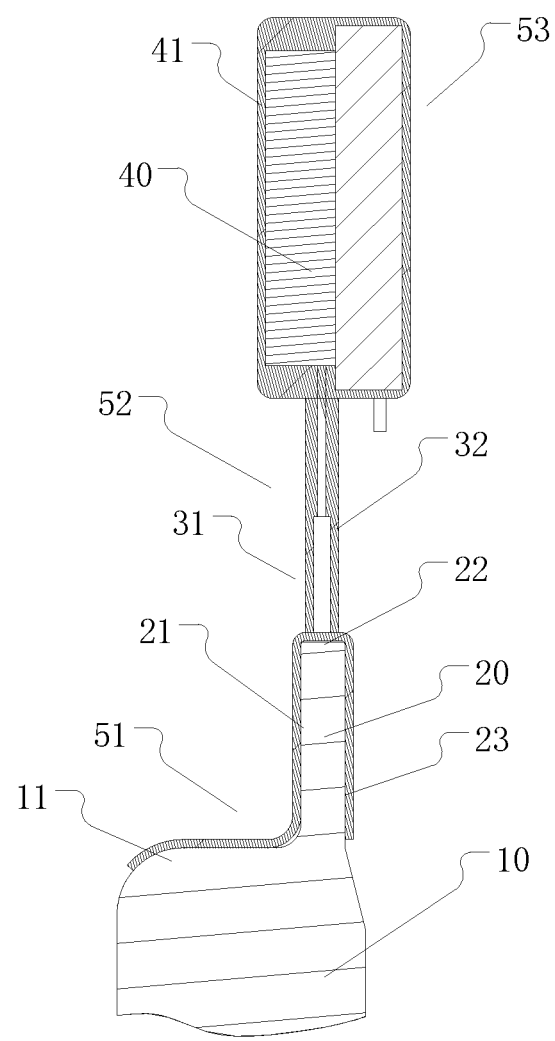
FIG. 6a to FIG. 6b are flowcharts of a process for forming the protection portion of the battery shown in FIG. 6.

Step 4. Coat the surface of the battery with the insulation curing material, the insulation curing material covering at least an exposed cross section of the first side, and a first protection layer 50 being formed after the insulation curing material is cured. Step 4 specifically includes:

I) As shown in FIG. 6a, coat the surface of the first side 20 with the insulation curing material, the insulation curing material covering an upper surface 21 of the first side, an exposed cross section of the first side 20, and a lower surface 23 of the first side, and coat the front end surface 11 of the main body 10 with the insulation curing material, a package bag protection layer 51 being formed after the insulation curing material is cured.

II) As shown in FIG. 6a, coat the surface of the terminal 30 with the insulation curing material, the insulation curing material covering an upper surface 31 and a lower surface 32 of the terminal, and a terminal protection layer 52 being formed after the insulation curing material is cured.

III) As shown in FIG. 6a, coat the entire surface of the circuit board assembly 40 with the insulation curing material, a circuit board assembly protection layer 53 being formed after the insulation curing material is cured.

Figure 6B:
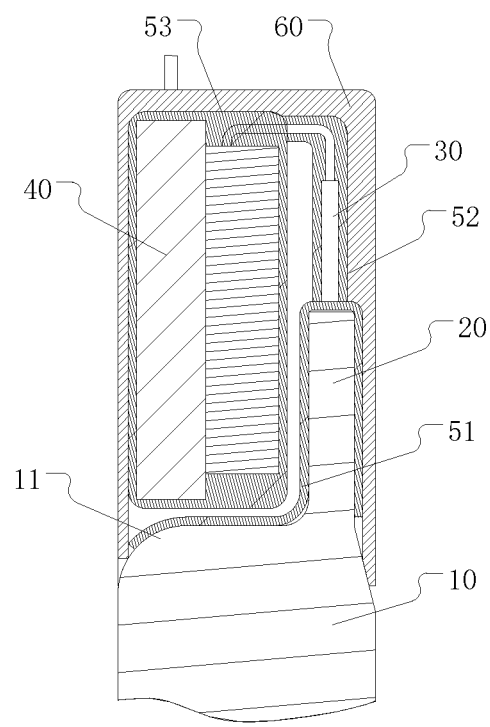

Step 5. As shown in FIG. 6b, fold the circuit board assembly 40 into an accommodation space formed by the front end surface 11 of the main body 10 and the upper surface 21 of the first side. In this case, in step II, the upper surface 31 of the terminal 30 which is coated with the insulation curing material is disposed towards the circuit board assembly 40, and the lower surface 32 of the terminal 32 is disposed away from the circuit board assembly 40.

Step 6. Coat the surface of the protection portion with the insulation curing material, a second protection layer 60 being formed after the insulation curing material is cured. In order to enhance the insulation performance and reliability, during coating of the insulation curing material, the insulation curing material further covers a part of the package bag protection layer 51 which is located on the lower surface of the first side 20.

Further, in step 7, an insulation tape may be further adhered to the surface of the protection portion to form a surface protection layer 80, or an insulation tape is adhered to both the surfaces of the protection portion and the main body 10 to form a surface protection layer 80, so as to further enhance the insulation performance and strength of the battery.

In addition, in the battery, when the space formed by the front end surface 11 of the main body 10 and the upper surface 21 of the first side is insufficient to accommodate the circuit board assembly 40, the circuit board assembly 40 can also be disposed directly along an extending direction of the terminal 30 after being electrically connected to the terminal 30. During insulation protection, internal-external double protection can still be formed through the insulation curing material, and third-layer protection can further be formed on the surface through the insulation tape.

An embodiment of the present application further provides a manufacturing method for a battery. The manufacturing method mainly includes the following steps:

packaging an electrode in a package bag 90, a terminal 30 of the electrode having one end connected to the electrode and located inside the package bag 90, and the other end located outside the package bag 90;

electrically connecting a circuit board assembly 40 to the other end of the terminal 30 to form a protection portion; and coating the surface of the battery with an insulation curing material, a protection layer being formed after the insulation curing material is cured, and the protection layer covering the protection portion.

Based on the foregoing solution, in a specific implementation, when the surface of the circuit board assembly 40 is provided with an exposed region and a protected region, the step of coating the surface of the battery with an insulation curing material, a protection layer being formed after the insulation curing material is cured, and the protection layer covering the protection portion specifically includes: coating the surface of the battery with the insulation curing material, so that the insulation curing material covers the protected region to expose the configuration of the exposed region, and the protection layer is formed after the insulation curing material is cured. The protected region is an area requiring insulation protection. The protection layer covers the protected region. The exposed region is exposed and used for heat dissipation, temperature sensing, and the like.

In another specific implementation, when the package bag 90 includes a main body 10 accommodating the electrode and a first side 20 connected to the main body 10, the first side 20 is laid in a flat manner, the terminal 30 extends out from the first side 20, and an accommodation space for accommodating the circuit board assembly is formed between the main body 10 and the first side 20, the step of coating the surface of the battery with an insulation curing material, a protection layer being formed after the insulation curing material is cured, and the protection layer covering the protection portion specifically includes the following steps:

Step 1. After the circuit board assembly 40 is electrically connected to the terminal 30 of the electrode, coat the surface of the battery with the insulation curing material, the insulation curing material covering at least an exposed cross section of the first side 20, and a first protection layer 50 being formed after the insulation curing material is cured. The first protection layer 50 may include a package bag protection layer 51, a terminal protection layer 52, and a circuit board assembly protection layer 53. A specific process includes coating the surface of the first side 20 with the insulation curing material, the insulation curing material covering at least the exposed cross section of the first side 20 and an upper surface 21 of the first side 20. The process further includes coating a front end surface 11 of the main body 10 with the insulation curing material, the package bag protection layer 51 being formed after the insulation curing material is cured. The package bag protection layer 51 not only can provide insulation protection for the exposed cross section of the first side 20, but also can prevent the package bag 90 (parts corresponding to the front end surface 11 of the main body 10 and the upper surface 21 of the first side) from being broken when pressed by the circuit board assembly 40, thereby avoiding battery short circuit. Further, the process further includes coating the surface of the terminal 30 with the insulation curing material, the insulation curing material covering at least an upper surface 31 of the terminal, and a protection layer of the terminal 30 being formed after the insulation curing material is cured. The process further includes coating the surface of the circuit board assembly 40 with the insulation curing material, the insulation curing material covering at least pins in the circuit board assembly 40, and a circuit board assembly protection layer being formed after the insulation curing material is cured.

Step 2. Fold the circuit board assembly 40 into an accommodation space formed between the main body 10 and the first side 20. In this case, the upper surface 21 of the first side is disposed towards the circuit board assembly 40, the front end surface 11 of the main body is disposed towards the circuit board assembly 40, and the upper surface 31 of the terminal is disposed towards the circuit board assembly 40.

Step 3. Coat the surface of the protection portion with the insulation curing material, a second protection layer 60 being formed after the insulation curing material is cured. When some electronic components with high heat output are disposed on the circuit board assembly 40, partial surfaces of the electronic components may be set as exposed regions, so as to facilitate heat dissipation. The first protection layer 50 and the second protection layer 60 cover other areas except the exposed regions.

In another embodiment, the manufacturing method further includes adhering an insulation tape to the surface of the battery to form a surface protection layer 80. The surface protection layer 80 covers at least the protection portion. As such, the insulation performance and reliability of the battery are further enhanced through an internal protection layer, an external protection layer, and a surface protection layer.

In the foregoing embodiment, an insulation tape is replaced with the insulation curing material, and the surface of the battery is coated with the insulation curing material by using a coating process or an injection molding process. During curing, the insulation curing material can be tightly adhered to the surfaces of elements requiring insulation protection, thereby improving the strength and reliability of the battery. Moreover, the insulation curing material can adapt to structures of various sizes during coating, and achieves high adaptability and production efficiency.

Obviously, a person skilled in the art can make various modifications and variations to the present application without departing from the spirit and scope of the present application. As such, if the modifications and variations of the present application fall within the claims of the present application and the equivalent technical scope thereof, the present application is also intended to cover the modifications and variations.

What is claimed is:

1. A battery, comprising: a package bag, an electrode, and a circuit board assembly; wherein the electrode is located in the package bag, and the electrode is provided with a terminal, the terminal having one end connected to the electrode and located inside the package bag and another end located outside the package bag;

wherein the other end of the terminal is electrically connected to the circuit board assembly to form a protection portion;

the protection portion includes a printed circuit board and electronic components mounted on the printed circuit board;

the package bag comprises a main body accommodating the electrode and a first edge extended from the main body, and the terminal extending out from the first edge;

the first edge and a side of the main body define an open accommodation space for accommodating the circuit board and the electronic components; and the accommodation space is filled with an insulation material to cover the electronic components and the printed circuit board.

2. The battery according to claim 1, wherein the insulation material is formed by injection molding.

3. The battery according to claim 2, wherein the insulation material comprises at least one selected from the group consisting of an ultraviolet curing adhesive, silica gel, an epoxy resin, a hot-melt resin, and a Nano material.

4. The battery according to claim 1, wherein the surface of the circuit board assembly is provided with a protected region and an exposed region; wherein the protection layer coversing the protected region.

5. The battery according to claim 1, wherein the protected region comprises areas on the electronic components and/or test areas on the circuit board.

6. The battery according to claim 1, wherein the protection layer comprises a first protection layer and a second protection layer; the first protection layer covers at least an exposed cross section of the first edge, and the second protection layer coversing the surface of the protection portion.

7. The battery according to claim 6, wherein the first protection layer comprises a package bag protection layer, the package bag protection layer covers at least the exposed cross section of the first edge, an upper surface of the first edge is disposed towards the circuit board assembly, and a front end surface of the main body is disposed towards the circuit board assembly.

8. The battery according to claim 7, wherein the first protection layer further comprises a terminal protection layer, the terminal protection layer covers at least an upper surface of the terminal disposed towards the circuit board assembly.

9. The battery according to claim 7, wherein the first protection layer further comprises a circuit board assembly protection layer, the circuit board assembly protection layer covers at least pins in the circuit board assembly.

10. The battery according to claim 1, wherein the package bag further comprises a second side connected to the main body, the second side being laid in a flat manner or fixed in a bent manner on a side surface of the main body; and the protection layer further comprises a third protection layer, the third protection layer covers at least an exposed cross section of the second side.

11. The battery according to claim 1, further comprising a surface protection layer formed by an insulation material, the protection layer being disposed between the surface protection layer and the protection portion.

12. A method for manufacturing the battery of claim 1, the method comprising the following steps:

packaging the electrode in the package bag;

electrically connecting the circuit board assembly to the other end of the terminal to form the protection portion; and coating the surface of the battery with an insulation curing material, a protection layer being formed after the insulation curing material is cured, and the protection layer covering the protection portion.

13. The method according to claim 12, wherein when the surface of the circuit board assembly is provided with an exposed region and a protected region, the step of coating the surface of the battery with an insulation curing material, a protection layer being formed after the insulation curing material is cured, and the protection layer covering the protection portion, specifically comprises:

coating the surface of the battery with the insulation curing material, the insulation curing material covering at least the protected region, the exposed region being exposed, and the protection layer being formed after the insulation curing material is cured.

14. The method according to claim 12, wherein when the package bag comprises a main body accommodating the electrodes and a first edge connected to the main body, the first edge is laid in a flat manner, the terminal extends out from the first edge, and an accommodation space for accommodating the circuit board assembly is formed between the main body and the first edge, the step of coating the surface of the battery with an insulation curing material, a protection layer being formed after the insulation curing material is cured, and the protection layer covering the protection portion, specifically comprises:

after the circuit board assembly is electrically connected to the terminal of the electrode, coating the surface of the battery with the insulation curing material, the insulation curing material covering at least an exposed cross section of the first edge, and a first protection layer being formed after the insulation curing material is cured;

folding over the circuit board assembly into the accommodation space; and coating the surface of the protection portion with the insulation curing material, a second protection layer being formed after the insulation curing material is cured.

15. The method according to claim 14, wherein the step of coating the surface of the battery with the insulation curing material, the insulation curing material covering at least an exposed cross section of the first edge, and a first protection layer being formed after the insulation curing material is cured specifically comprises:

coating the surface of the first edge with the insulation curing material, the insulation curing material covering at least the exposed cross section of the first edge and an upper surface of the first edge, and further coating a front end surface of the main body with the insulation curing material, a package bag protection layer being formed after the insulation curing material is cured, wherein after the circuit board assembly is folded into the accommodation space, the upper surface of the first edge is disposed towards the circuit board assembly, and the front end surface of the main body is disposed towards the circuit board assembly.

16. The method according to claim 15, further comprising coating the surface of the circuit board assembly with the insulation curing material, the insulation curing material covering at least pins in the circuit board assembly, and a circuit board assembly protection layer being formed after the insulation curing material is cured.

17. The method according to claim 15, further comprising coating the surface of the terminal with the insulation curing material, the insulation curing material covering at least an upper surface of the terminal, and a terminal protection layer being formed after the insulation curing material is cured, wherein after the circuit board assembly is folded into the accommodation space, the upper surface of the terminal is disposed towards the circuit board assembly.

18. The method according to claim 12, further comprising forming a surface protection layer by adhering an insulation tape to the surface of the battery, the surface protection layer covering at least the protection portion.

* * * * *